(12) United States Patent
Machida et al.

(10) Patent No.: US 8,720,908 B2
(45) Date of Patent: May 13, 2014

(54) VEHICLE COMPONENT AND SEALING MEMBER

(75) Inventors: Yoshikazu Machida, Isehara (JP); Masahiro Natsume, Kawagoe (JP); Katsumi Sakamoto, Fukuyama (JP); Kazuya Fujita, Fukuyama (JP)

(73) Assignees: Ichikoh Industries, Ltd., Tokyo (JP); Natsume Co., Ltd., Tokyo (JP); Hayakawa Rubber Co., Ltd., Fukuyama (JP)

( * ) Notice: Subject to any disclaimer, the term of this patent is extended or adjusted under 35 U.S.C. 154(b) by 482 days.

(21) Appl. No.: 11/727,007

(22) Filed: Mar. 23, 2007

(65) Prior Publication Data

US 2007/0228758 A1 Oct. 4, 2007

(30) Foreign Application Priority Data

Apr. 3, 2006 (JP) ................. 2006-101836

(51) Int. Cl.
*F16J 15/02* (2006.01)
(52) U.S. Cl.
USPC ........... 277/628; 277/627; 277/630; 277/650; 277/654
(58) Field of Classification Search
USPC ......... 277/590, 591, 602, 606, 609, 616, 627, 277/628, 630, 637, 650, 654, 921
See application file for complete search history.

(56) References Cited

U.S. PATENT DOCUMENTS

| 3,086,216 | A | * | 4/1963 | Brooks et al. | 428/102 |
|---|---|---|---|---|---|
| 3,322,433 | A | * | 5/1967 | Rentschler | 277/652 |
| 4,900,770 | A | | 2/1990 | Tomita et al. | |
| 5,730,446 | A | * | 3/1998 | Taylor et al. | 277/312 |
| 6,073,938 | A | * | 6/2000 | Abe et al. | 277/654 |
| 6,755,422 | B2 | * | 6/2004 | Potter | 277/652 |
| 7,247,369 | B2 | * | 7/2007 | Mrozinski et al. | 428/304.4 |
| 7,749,635 | B2 | * | 7/2010 | Kuroki et al. | 277/650 |
| 2006/0131819 | A1 | * | 6/2006 | Kurano et al. | 277/628 |

FOREIGN PATENT DOCUMENTS

| EP | 0 892 209 A2 | 1/1999 | |
|---|---|---|---|
| GB | 2 010 418 A | 6/1979 | |
| JP | 03-15748 U | 2/1991 | |
| JP | 05-025445 A | 2/1993 | |
| JP | 6-231603 A | 8/1994 | |
| JP | 09-125049 A | 5/1997 | |
| JP | 09-131822 A | 5/1997 | |
| JP | 11-291434 A | 10/1999 | |
| JP | 2000-90725 A | 3/2000 | |
| WO | WO 02073072 | * 9/2002 | F16J 15/10 |

* cited by examiner

*Primary Examiner* — Gilbert Lee
(74) *Attorney, Agent, or Firm* — Foley & Lardner LLP

(57) ABSTRACT

A vehicle component includes a sealing member that is sandwiched between the vehicle component and a vehicle body to seal a gap between the vehicle component and the vehicle body. The sealing member includes an adhering/separating member that is adhereable to and separable from a wall of the vehicle body, and an elastic compressing member that is elastically compressible and stacked on the adhering/separating member. The adhering/separating member adheres to the wall of the vehicle body when the sealing member is present between the vehicle component and the vehicle body.

13 Claims, 6 Drawing Sheets

A-A VIEW

FIG.9

| | EXAMPLE ACCORDING TO PRESENT INVENTION 1 | EXAMPLE ACCORDING TO PRESENT INVENTION 2 | EXAMPLE ACCORDING TO PRESENT INVENTION 3 | EXAMPLE ACCORDING TO PRESENT INVENTION 4 | COMPARISON EXAMPLE 1 | COMPARISON EXAMPLE 2 | COMPARISON EXAMPLE 3 |
|---|---|---|---|---|---|---|---|
| HARDNESS | 33 | 34 | 38 | 45 | 47 | 48 | 50 |
| SEALING CHARAC-TERISTICS | OK | OK | OK | OK | NG | NG | NG |

VEHICLE COMPONENT AND SEALING MEMBER

CROSS-REFERENCE TO RELATED APPLICATIONS

The present document incorporates by reference the entire contents of Japanese priority document, 2006-101836 filed in Japan on Apr. 3, 2006.

BACKGROUND OF THE INVENTION

1. Field of the Invention

The present invention relates to a vehicle component and a sealing member that seals a gap between the vehicle component and a vehicle.

2. Description of the Related Art

In a vehicle component such as a tail lamp, a sealing member is arranged in a gap between the vehicle component and a vehicle to prevent waterlogging. A sponge shaped packing is widely used for the sealing member. In the conventional vehicle component, the sealing member is sandwiched in the gap with strong pressure, which enhances sealing characteristics of the sealing member.

As a conventional vehicle component that includes a sealing member, the one disclosed in Japanese Patent Application Laid-open No. 2000-90725 is known. In the conventional vehicle component (vehicle lamp), an annular rib is formed on the back surface of a lamp body, and an elastic sealing member is attached to a tip of the annular rib. At least, part of the annular rib includes multiple ribs.

SUMMARY OF THE INVENTION

It is an object of the present invention to at least partially solve the problems in the conventional technology.

According to an aspect of the present invention, a vehicle component includes a sealing member that is located between the vehicle component and a vehicle body to seal a gap between the vehicle component and the vehicle body. The sealing member includes a first sealing member that is adhereable to and separable from a wall of the vehicle body, and a second sealing member that is elastically compressible and stacked on the first sealing member. The first sealing member adheres to the wall when the sealing member is present between the vehicle component and the vehicle body.

According to another aspect of the present invention, a sealing member that is located between a pair of components and seals a gap between the components, includes a first sealing member that is adhereable to and separable from a wall of one of the components, and a second sealing member that is elastically compressible and stacked on the first sealing member. The first sealing member adheres to the wall when the sealing member is present between the components.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a table of the result of the performance test.

DETAILED DESCRIPTION OF THE PREFERRED EMBODIMENTS

Exemplary embodiments of the present invention are explained in detail below with reference to the accompanying drawings.

Figure 1:
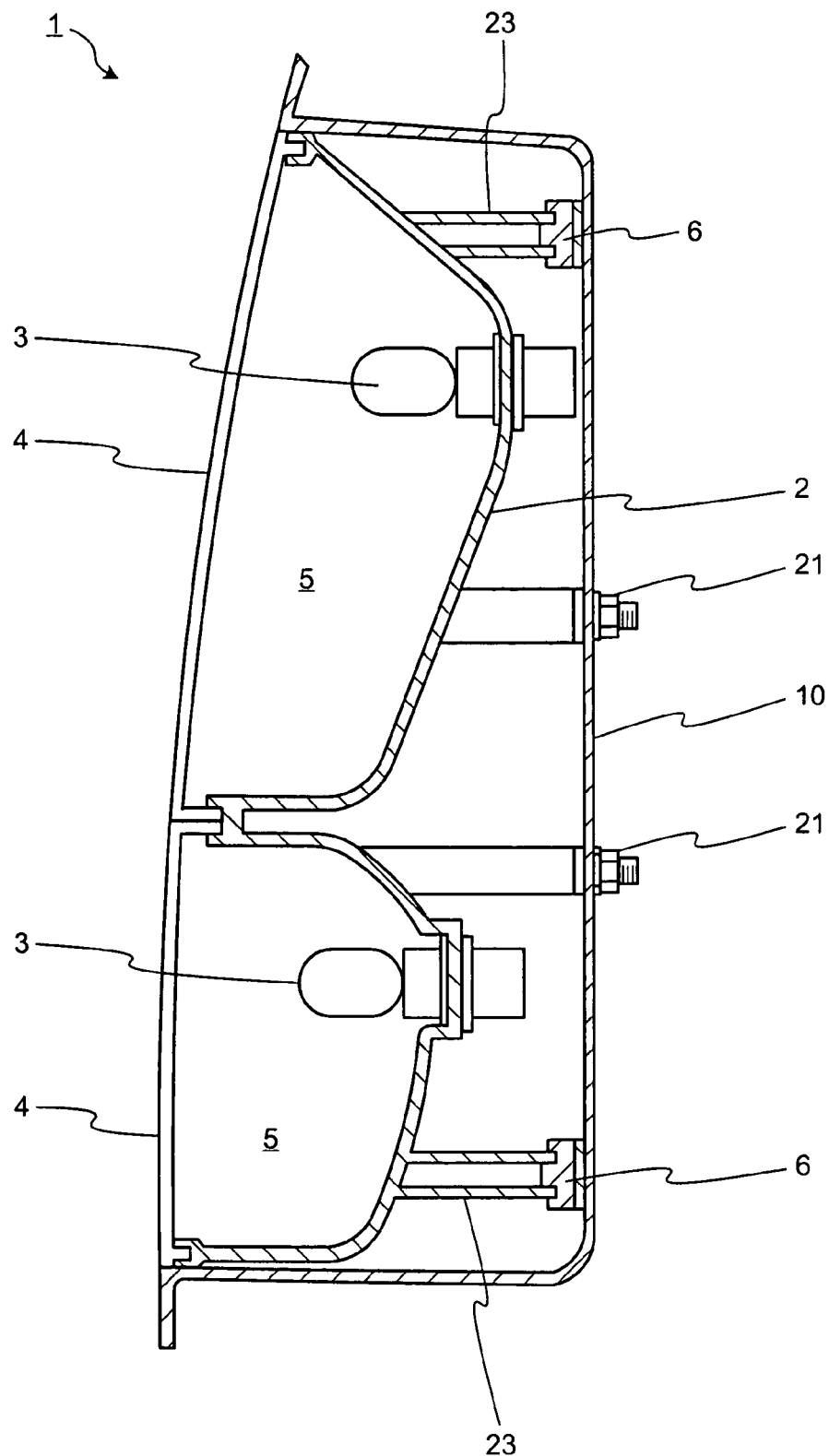
FIG. 1 is a cross section of a vehicle component according to an embodiment of the present invention.
Figure 2:
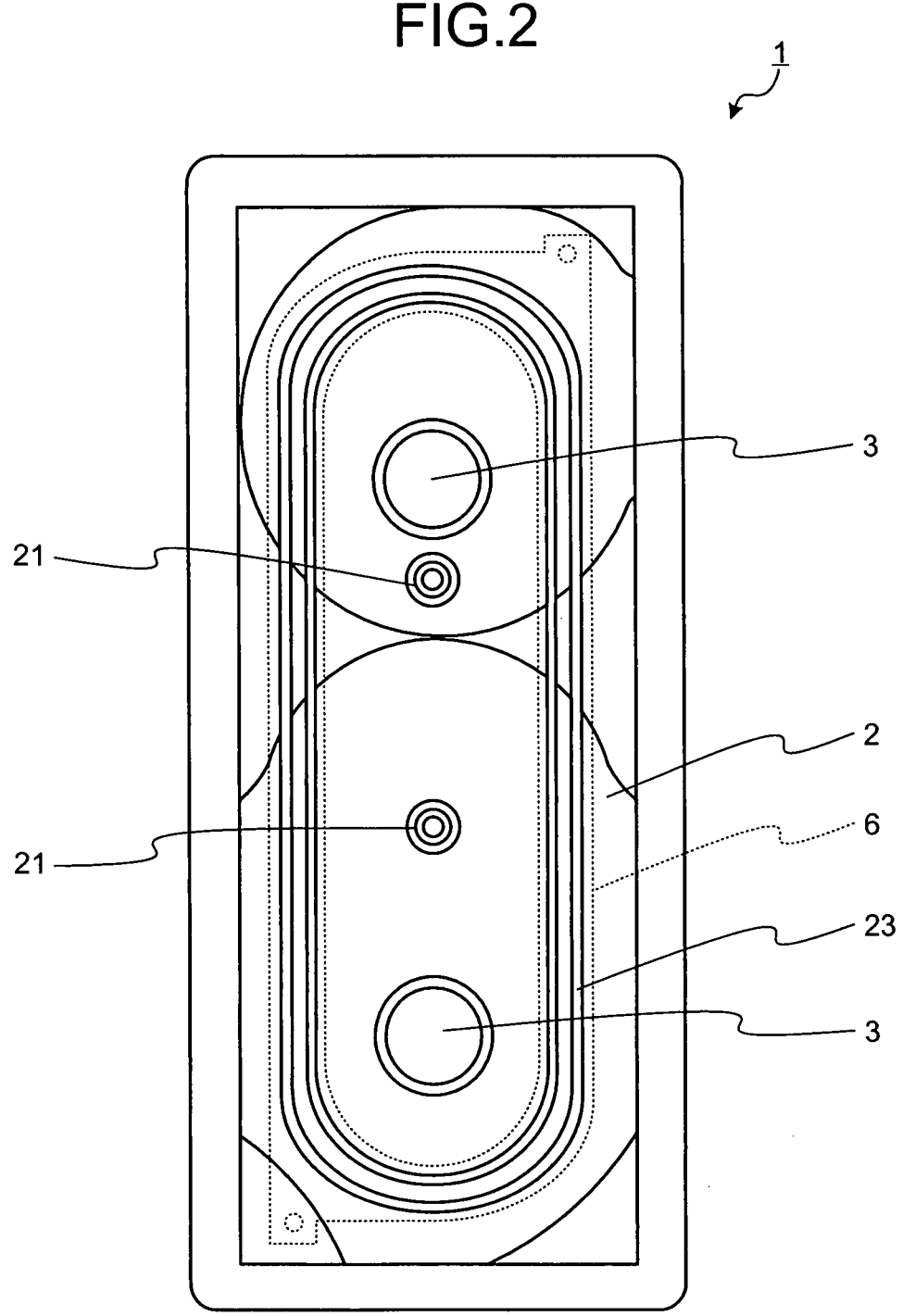
FIG. 2 is a rear view of the vehicle component.
Figure 3:
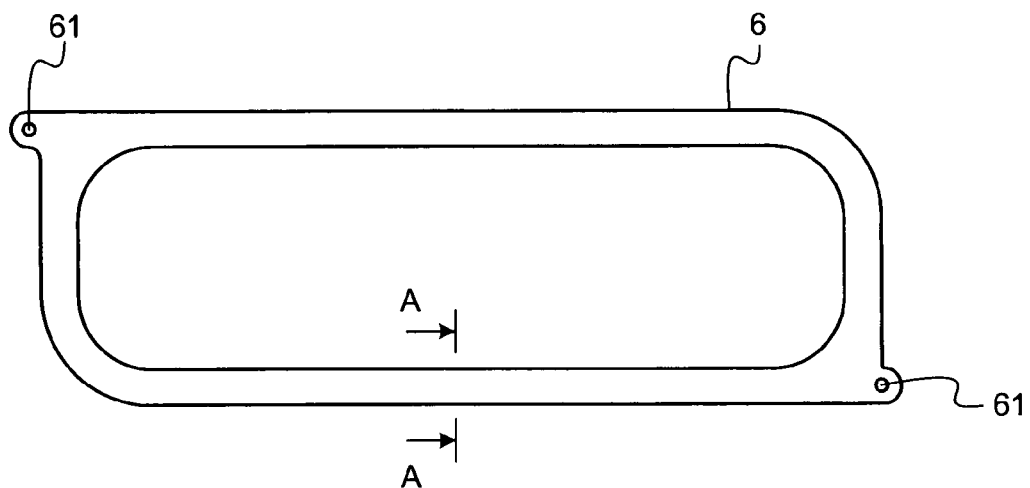
FIG. 3 is a plan view of a sealing member of the vehicle component.
Figure 4:
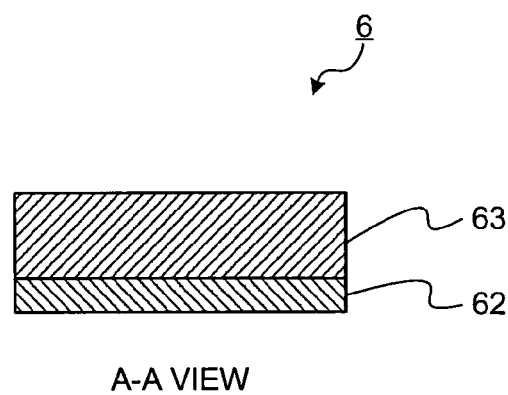
FIG. 4 is a cross section taken from line A-A of FIG. 3.
Figure 5:
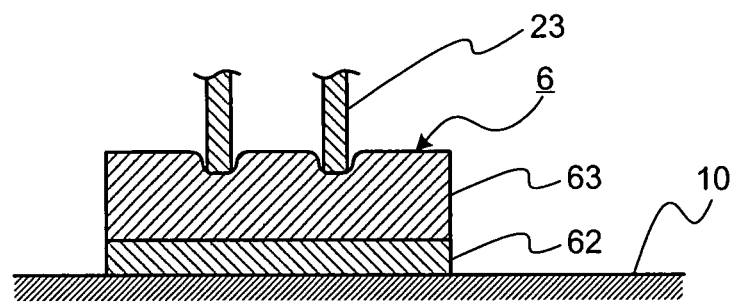
FIG. 5 is a schematic for explaining an operation of the sealing member.
Figure 6:
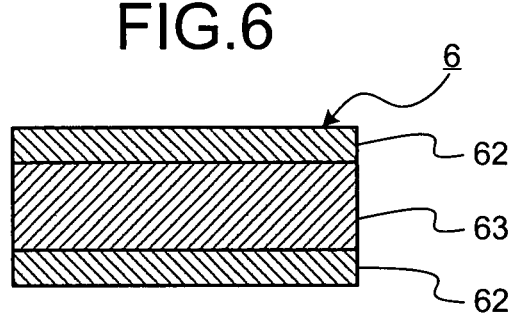
FIG. 6 is a cross section of a modification of the sealing member.
Figure 7:
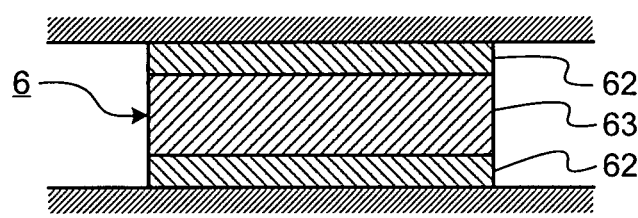
FIG. 7 is a schematic for explaining an operation of the modification of the sealing member.
Figure 8:
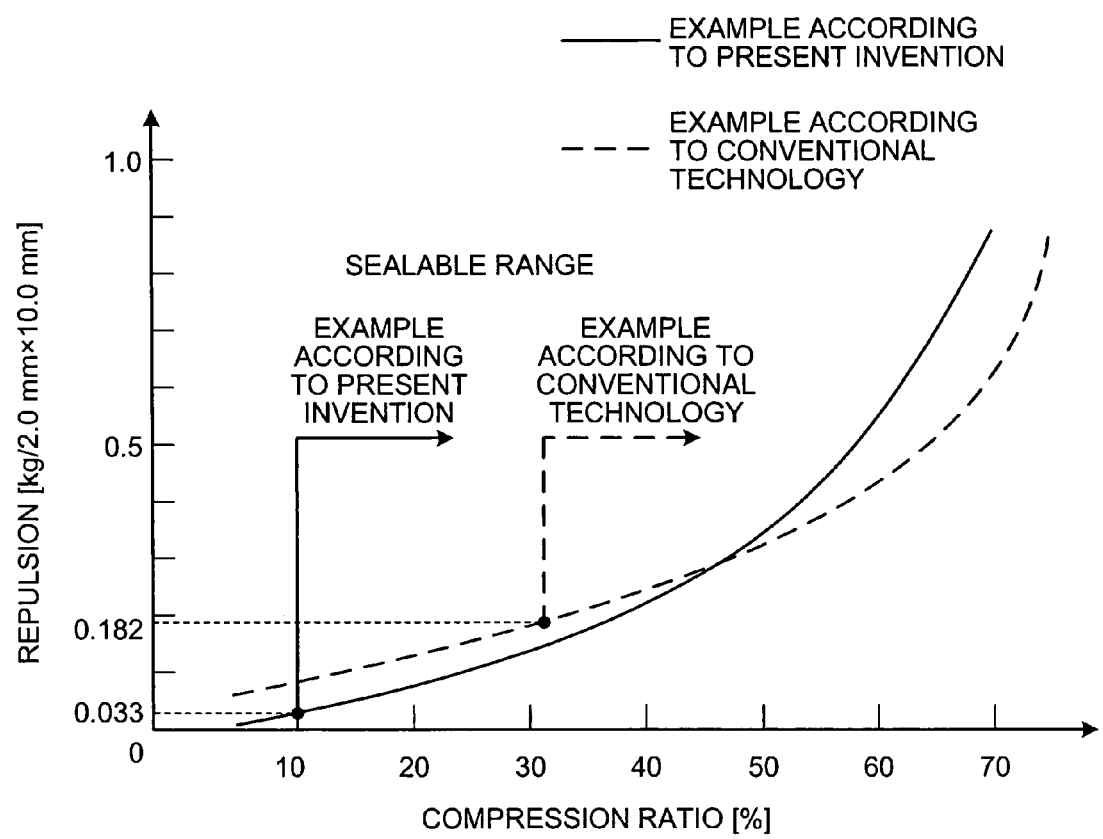
FIG. 8 is a graph of a result of a performance test of the sealing member.

FIG. 1 is a cross section of a vehicle component according to an embodiment of the present invention. FIG. 2 is a rear view of the vehicle component. FIG. 3 is a plan view of a sealing member of the vehicle component. FIG. 4 is a cross section taken from line A-A of FIG. 3. FIG. 5 is a schematic for explaining an operation of the sealing member. FIG. 6 is a cross section of a modification of the sealing member. FIG. 7 is a schematic for explaining an operation of the modification. FIG. 8 is a graph of a result of a performance test of the sealing member. FIG. 9 is a table of the result of the performance test.

A vehicle component 1 is applied to a vehicle lamp such as a tail lamp or a vehicle mirror device such as an outside mirror. Application of the vehicle component 1 to the vehicle lamp is explained in the embodiment (see FIGS. 1 and 2).

The vehicle component 1 (vehicle lamp) includes a housing 2, a light source 3, and a lens 4. The vehicle component 1 is fitted to a component (vehicle body panel) on the side of a vehicle body 10 (see FIG. 1). The housing 2 includes a plurality of fasteners 21, 21 on the back surface. The vehicle component 1 is fitted to the vehicle body 10 with the fasteners 21, 21. Due to this, the entire vehicle component 1 is fixed on the vehicle body 10. The light source 3 is housed inside the housing 2 and connected from the back surface of the housing 2 to a power source (not shown) of the vehicle body 10. The lens 4 is arranged on an anterior surface of the light source 3 and fitted to the housing 2. Further, the lens 4 and the housing 2 partition a lamp chamber 5.

The vehicle component 1 further includes a sealing member 6 (see FIG. 3). The sealing member 6 has an annular structure, and includes fixing holes 61, 61 at both ends. The sealing member 6 is arranged along an annular rib 23 on the back surface of the housing 2. Through the fixing holes 61, 61, the sealing member 6 is fixed to the housing 2 by being screwed thereon (see FIG. 2).

The sealing member 6 includes an adhering/separating member 62 and an elastic compressing member 63 that are stacked (see FIG. 4). For example, the adhering/separating member 62 is made of a butyl rubber, an unvulcanized rubber, or a plastic material, and has adhesion properties (adhesiveness or tackability) and separability with respect to a wall of the vehicle body 10. In other words, the adhering/separating member 62 is made of a material that can adhere to the wall of the vehicle body 10 and can be easily separated from the wall of the vehicle body 10. Adhesion properties indicate adhereability to an extent such that if the adhering/separating member 62 is pressed against the wall of the vehicle body 10 by a predetermined pushing pressure, water does not pass through the surface boundary of the sealing member 6 and the wall of the vehicle body 10. Separability indicates separability to an extent such that the adhering/separating member 62 that is adhering to the wall of the vehicle body 10 can be easily separated therefrom manually by an operator. Further, the adhesion properties and the separability can be suitably modified within a range obvious to those skilled in the art. Further, the wall (vehicle body panel) of the vehicle body 10 is formed of a coated steel plate.

The elastic compressing member 63 is made of a rubber based material, a polyethylene based material, or an elastomeric based material. The elastic compressing member 63 has a closed cell structure, a semi-closed cell structure (structure that partially includes a series of cells or foams) or a sponge-type structure. Accordingly, the elastic compressing member 63, which includes an elastically compressible structure, causes repulsion during compression. The adhering/separating member 62 and the elastic compressing member 63 are explained in detail later. The adhering/separating member 62 and the elastic compressing member 63 are joined using an acrylic adhesive material, an adhesive material or a two-sided tape.

Upon fitting the vehicle component 1 on the vehicle body 10, the sealing member 6 is sandwiched between the vehicle component 1 (the housing 2 and the rib 23) and the vehicle body 10 (vehicle body panel) (see FIG. 1). The sealing member 6 is pressed by the rib 23 of the housing 2 on the wall of the vehicle body 10, and the adhering/separating member 62 adheres to the wall of the vehicle body 10 (see FIG. 5). Due to the pushing pressure of the rib 23, the elastic compressing member 63 is compressed, and, due to the repulsion thereof, the adhering/separating member 62 is pressed and adheres to the wall of the vehicle body 10. Thus, the gap between the vehicle component 1 and the vehicle body 10.

In the vehicle component 1, the sealing member 6 includes the adhering/separating member 62 having adhesion properties that adheres to the wall of the vehicle body 10. Thus, the sealing member 6 adheres well to the wall of the vehicle body 10 and the surface boundary of the sealing member 6 and the vehicle body 10 is appropriately sealed. Thus, as compared to a sealing member made of the sponge, the gap between the vehicle component 1 and the vehicle body 10 is effectively sealed.

In the structure of the vehicle component 1, even when the repulsion of the elastic compressing member 63 is reduced due to time degradation, the sealing member 6 adheres to the wall of the vehicle body 10 due to the adhesion properties of the adhering/separating member 62. Thus, sealing characteristics of the gap between the vehicle component 1 and the vehicle body 10 are appropriately maintained.

Generally, if strong pushing pressure is applied to the sealing member, a compression ratio of the sealing member increases, which causes strong repulsion that presses the sealing member strongly against the vehicle body and enhances the sealing characteristics. However, application of strong pushing pressure may cause deformation of the vehicle body. Thus, securing the sealing characteristics with low pushing pressure is desirable. Besides, the gap between the vehicle component (rib) and the vehicle body (vehicle body panel) is not uniform, and, when the sealing member is arranged in the gap, the pushing pressure applied to the sealing member is uneven. Due to this, the sealing characteristics are reduced at a position of weak pushing pressure, resulting in occurrence of waterlogging. Thus, even if the pushing pressure applied to the sealing member is weak, securing required sealing characteristics of the sealing member is desirable. In other words, it is desirable that the required sealing characteristics be secured while compression ratio (repulsion) of the sealing member is set to low.

In the vehicle component 1, because the sealing characteristics are enhanced in the surface boundary of the sealing member 6 and the wall of the vehicle body 10, the necessary sealing characteristics are secured using the weak pushing pressure (see FIGS. 8 and 9). Thus, occurrence of deformation of the vehicle body 10 can be suppressed or rigidity of the vehicle component 1 and the vehicle body 10 can be reduced. Further, in the structure of the vehicle component 1, because the compression ratio of the sealing member 6 can be set low, the thin sealing member 6 (elastic compressing member 63) can be used, which reduces the manufacturing cost. Furthermore, the vehicle component 1 can be easily mounted on the vehicle body 10.

For example, in the structure of a vehicle component in which its sealing member is adhered to a vehicle body with an adhesive, undesirable adhesive marks remain on the vehicle body when the vehicle component needs to be replaced. However, in the vehicle component 1, the sealing member 6 includes the separable adhering/separating member 62. The vehicle component 1 touches the wall of the vehicle body 10 via the adhering/separating member 62. Due to this, the sealing member 6 can be easily separated from the wall of the vehicle body 10 at the time of replacement of the vehicle component 1 with little adverse effect on the vehicle body 10.

For example, in the structure that includes a sealing member made of a sticky material, scraps and dust stick to a contact portion of the sealing member and the vehicle body, and such is not desirable. In the vehicle component 1, the sealing member 6 includes the adhering/separating member 62 that is adhereable. The sealing member 6 touches the wall of the vehicle body 10 due to adhesion instead of stickiness. Thus, sticking of scraps and the like in the contact portion is reduced.

In the vehicle component 1, it is desirable that the adhering/separating member 62 be made of non-vulcanized rubber. In the structure of the vehicle component 1, the adhering/separating member 62 adheres firmly to the wall of the vehicle body 10, thereby enhancing the sealing characteristics of the sealing member 6 in the surface boundary. Due to this, the gap between the vehicle component 1 and the vehicle body 10 is effectively sealed. The non-vulcanized rubber is a rubber material that is not vulcanized by heat and is different from the unvulcanized rubber (rubber material before vulcanization). The non-vulcanized rubber is widely used in construction material such as waterproofing sheets used for a roof.

In the vehicle component 1, it is desirable that the adhering/separating member 62 be made of a plastic material. In the structure of the vehicle component 1, the adhering/separating member 62 deforms according to the shape of the wall of the vehicle body 10, thereby enhancing the adhesion properties (adhesiveness) of the adhering/separating member 62 with respect to the wall of the vehicle body 10. Thus, the gap between the vehicle component 1 and the vehicle body 10 is effectively sealed.

In the vehicle component 1, it is also desirable that the adhering/separating member 62 be made of a non-permeable material. With this, permeation of water through the adhering/separating member 62 and subsequent waterlogging can be prevented. Thus, the gap between the vehicle component 1 and the vehicle body 10 is effectively sealed.

Examples of the non-vulcanized rubber material, the plastic material or the non-permeable material include butyl rubber (isobutylene isoprene rubber (IIR)), ethylene propylene rubber (ethylene propylene diene monomer (EPDM) or ethylene propylene monomer (EPM)), natural rubber (NR), isoprene rubber (IR), styrene butadiene rubber (SBR), butadiene rubber (BR), 1,2-polybutadiene, chloroprene rubber (CR), acrylonitrile-butadiene rubber (nitrile butadiene rubber (NBR), acrylonitrile-isoprene rubber (NIR), or acrylonitrile-isoprene-butadiene rubber (NBIR)), chlorosulphonated polyethylene (CSM), chlorinated polyethylene (CM), acrylic rubber (ACM or ANM), epichlorohydrin rubber (CO or ECO), silicone rubber (Q), fluororubber (F), urethane rubber (U), polysulfide rubber (OT or EOT), asphalt, styrene-butadiene styrene copolymer (SBS), styrene-ethylene-butadiene-styrene copolymer (SEBS), ethylene vinyl acetate (EVA), polyvinyl chloride (PVC), polyethylene (PE), polypropylene (PP), fatty acid ester, and wax.

In the vehicle component 1, it is desirable that the adhering/separating member 62 be made of butyl rubber, ethylene-propylene rubber, or a mixture of butyl rubber and ethylene-propylene rubber. With this, the adhering/separating member 62 that is adhereable and separable is realized.

Further, in the vehicle component 1, it is also desirable that the adhering/separating member 62 made of butyl rubber, ethylene-propylene rubber, or the mixture of butyl rubber and ethylene-propylene rubber be added with 2 percent to 20 percent of a modified polymer. Examples of the modified polymer include ethyl vinyl acetate, styrene-butadiene styrene copolymer, styrene-ethylene-butadiene-styrene copolymer, low-density polyethylene, polypropylene, asphalt, fatty acid ester, and wax. With this, the adhering/separating member 62 having optimum adhesion properties and separability is realized.

Further, in the vehicle component 1, it is desirable that the elastic compressing member 63 be made of a non-permeable material. With this, permeation of water through the elastic compressing member 63 and subsequent waterlogging is prevented. Thus, the gap between the vehicle component 1 and the vehicle body 10 is effectively sealed. A material having a closed cell structure can be used as the non-permeable material.

In the vehicle component 1, it is desirable that the adhering/separating member 62 be made of butyl rubber having a type A hardness according to Japanese Industrial Standard (JIS) K6253 less than or equal to 45, and that the elastic compressing member 63 have the repulsion larger than or equal to 0.033 [kg/2.0 mm×10.0 mm] ($=0.66\times10^{-3}$ [kg/mm$^2$]) at the compression ratio of about 10 percent. With this structure, appropriate sealing characteristics are secured with low pushing pressure (see FIGS. 8 and 9). Due to this, a load on the vehicle component 1 and the vehicle body 10 due to the repulsion of the sealing member 6 is reduced.

Further, in the structure of the vehicle component 1, it is desirable that a lower limit of hardness of the adhering/separating member 62 (butyl rubber) be set greater than or equal to 20. With this, strength and rigidity of the adhering/separating member 62 are secured.

In the vehicle component 1, the sealing member 6 preferably includes a pair of the adhering/separating members 62, 62 that sandwich the elastic compressing member 63 therebetween (see FIGS. 6 and 7). With this structure, for example, upon the sealing member 6 being sandwiched in a gap between opposing walls (the wall of the vehicle component 1 and the wall of the vehicle body 10), the adhering/separating members 62, 62 display adhesion properties and separability on both the surfaces of the sealing member 6. Due to this, apart from effectively sealing the gap between the walls, the sealing member 6 is also easily separated from the walls.

In the embodiment, the sealing member 6 is arranged in the gap between the vehicle component 1 and the vehicle body 10. Because the sealing member 6 is easily adhereable and separable, applying the sealing member 6 in such a manner achieves the effects as explained above in the vehicle component 1. However, application of the sealing member 6 is not to be thus limited, and the sealing member 6 can also be applied for other purposes. For example, the sealing member 6 can be sandwiched between a pair of components in the vehicle body 10. With this structure, favorable sealing effect can be achieved by the sealing member 6.

A performance test related to the sealing characteristics was conducted for the sealing member 6 (example according to the present invention) of the vehicle component 1 of the embodiment and a conventional sealing member (example according to a conventional technology) (see FIGS. 8 and 9). The sealing member 6 formed of layers of the adhering/separating member 62 made of butyl rubber having a thickness of 0.5 millimeters (mm) and the elastic compressing member 63 made of sponge having a thickness from 2.0 mm to 3.0 mm (see FIG. 3) was used in the example according to the present invention. The sealing member (not shown) made only of sponge having a thickness of 4.0 mm to 1.2 mm was used in the example according to the conventional technology.

In the performance test shown in FIG. 8, each of the sealing members was pressed by using a plate shaped member having a length of 10 mm and a thickness of 2.0 mm (an area of 20 mm$^2$), and a relation between the compression ratio and the repulsion of each of the sealing members was measured. Further, a submersion test was performed on each of the sealing members, and a relation (watertight-guarantee compression-ratio limit) between the compression ratio and a sealable range of the sealing members was measured. In the submersion test, the sealing members were sandwiched between a ring shaped jig having a height of 2.0 mm and a radius of 100.0 mm and an acrylic plate. The sealing members were submerged while being applied with compression at various ratios. After keeping the sealing members submerged at a water depth of 100 mm for one hour, waterlogging inside the ring of the jig was observed to make evaluation.

As shown in the test result of FIG. 8, with the sealing member 6 according to the embodiment, a repulsion of about 0.033 [kg/2.0 mm×10.0 mm] was generated at a compression ratio of about 10 percent, and it was found that appropriate sealing characteristics were secured at a compression ratio (repulsion) more than or equal to 10 percent. However, with the conventional sealing member, a repulsion of about 0.182 [kg/2.0 mm×10.0 mm] was generated at a compression ratio of about 30 percent, and it was found that appropriate sealing characteristics were secured at a compression ratio more than or equal to 30 percent. Thus, it is understood that, in the sealing member 6 according to the embodiment, appropriate sealing characteristics are secured at a lower compression ratio compared to the conventional sealing member.

Further, in the performance test shown in FIG. 9, the submersion test was performed on the sealing member 6 according to the embodiment, and a relation between the hardness (type A, JIS K6253) and the sealing characteristics of the adhering/separating member 62 (butyl rubber) was evaluated. In the performance test, the compression ratio of the sealing member 6 was set at 10 percent. In FIG. 9, "OK" indicates that waterlogging did not occur, while "NG" indicates that waterlogging occurred. As can be seen in the test result of FIG. 9, appropriate sealing characteristics are secured by setting the hardness of the adhering/separating member 62 to less than or equal to 45 when the compression ratio of the sealing member 6 is less than or equal to 10 percent.

As set forth hereinabove, according to an embodiment of the present invention, a sealing member includes an adhering/separating member having adhesion properties that adheres to a wall of a vehicle body. The sealing member firmly adheres to the wall, and a surface boundary of the sealing member and the vehicle body is sealed. Thus, a gap between the vehicle component and the vehicle body is effectively sealed compared to a vehicle component that uses a sealing member made of sponge.

Moreover, upon the sealing member being sandwiched in a gap between opposing walls (the wall of the vehicle component and the wall of the vehicle body), the adhering/separating member displays adhesion properties and separability on both surfaces of the sealing member. Due to this, apart from effectively sealing the gap between the walls, the sealing member is easily separated from the walls.

Furthermore, either or both the adhering/separating member and the elastic compressing member are made of a non-permeable material. Thus, permeation of water through the elastic compressing member can be prevented.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A manufacturing method of a vehicle component comprising:
    providing a sealing member:
    locating the sealing member between the vehicle component and a vehicle body to seal a gap between the vehicle component and the vehicle body, wherein
    the sealing member includes a first sealing member, consisting of a single layer, that is directly adhereable to and separable from a wall of the vehicle body. and a second sealing member that is elastically compressible and stacked on the first sealing member,
    the first sealing member adheres to the wall and the second sealing member is located on a side of the first sealing member opposite to the wall, from which the first sealing member is separable, when the sealing member is present between the vehicle component and the vehicle body, and
    the locating includes causing the first sealing member to be in direct contact with the wall without interposing any element and without using any adhesive agent between the first sealing member and the wall while the first sealing member is kept solid and then pressing the first sealing member against the wall via the second sealing member to cause the first sealing member to adhere to the wall, wherein the first sealing member and the second sealing member contact each other prior to the first sealing member contacting the wall.

2. The manufacturing method according to claim 1, wherein the first sealing member is made of non-vulcanized rubber.

3. The manufacturing method according to claim 1, wherein the first sealing member is made of a plastic material.

4. The manufacturing method according to claim 1, wherein the first sealing member is made of a non-permeable material.

5. The manufacturing method according to claim 1, wherein the first sealing member is made of a material selected from the group consisting of butyl rubber. ethylene-propylene rubber, and a mixture of butyl rubber and ethylene-propylene rubber.

6. The manufacturing method according to claim 1, wherein the first sealing member is made of a material selected from the group consisting of butyl rubber, ethylene-propylene rubber, and a mixture of butyl rubber and ethylene-propylene rubber, which is added with 2 percent to 20 percent of modified polymer selected from a group including ethyl vinyl acetate, styrene-butadiene styrene copolymer, styrene-ethylenebutadiene-styrene copolymer, styrene-isoprene-styrene copolymer, low-density polyethylene, polypropylene, asphalt. fatty acid ester, and wax.

7. The manufacturing method according to claim 1, wherein the second sealing member is made of a non-permeable material.

8. The manufacturing method according to claim 1, wherein the first sealing member is made of butyl rubber with a type A hardness defined by Japanese Industrial Standard K6253 less than or equal to 45, and the second sealing member has repulsion larger than or equal to about 0.033 [kg/2.0 mm×10.0 mm] at a compression ratio of about 10 percent.

9. The manufacturing method according to claim 1, wherein the first sealing member is made of a single material.

10. A manufacturing method of a sealing member that is located between a pair of components and seals a gap between the components, the method comprising:
    providing a first sealing member, consisting of a single layer, that is directly adhereable to and separable from a wall of one of the components; and
    providing a second sealing member that is elastically compressible and stacked on the first sealing member, wherein
    the first sealing member adheres to the wall and the second sealing member is located on a side at the first sealing member opposite to the wall, from which the first sealing member is separable, when the sealing member is present between the components, and
    causing the first sealing member to be in direct contract with the wall without interposing any element and without using any adhesive agent between the first sealing member and the wall while the first sealing member is kept solid and then pressing the first sealing member against the wall via the second sealing member to cause the first sealing member to adhere to the wall, wherein the first sealing member and the second sealing member contact each other prior to the first sealing member contacting the wall.

11. The manufacturing method according to claim 10, wherein the first sealing member is made of a single material.

12. A vehicle component made by the manufacturing method of claim 1.

13. A sealing member made by the manufacturing method of claim 10.

* * * * *

UNITED STATES PATENT AND TRADEMARK OFFICE
CERTIFICATE OF CORRECTION

| | | |
|---|---|---|
| PATENT NO. | : 8,720,908 B2 | Page 1 of 1 |
| APPLICATION NO. | : 11/727007 | |
| DATED | : May 13, 2014 | |
| INVENTOR(S) | : Machida et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this
Eleventh Day of August, 2015

Michelle K. Lee
*Director of the United States Patent and Trademark Office*